(12) United States Patent
Wilson et al.

(10) Patent No.: US 7,632,406 B2
(45) Date of Patent: Dec. 15, 2009

(54) SMART MEMBRANES FOR NITRATE REMOVAL, WATER PURIFICATION, AND SELECTIVE ION TRANSPORTATION

(75) Inventors: William D. Wilson, Pleasanton, CA (US); Charlene M. Schaldach, Pleasanton, CA (US); William L. Bourcier, Livermore, CA (US); Phillip H. Paul, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 735 days.

(21) Appl. No.: 11/110,598

(22) Filed: Apr. 19, 2005

(65) Prior Publication Data

US 2005/0252857 A1 Nov. 17, 2005

Related U.S. Application Data

(60) Provisional application No. 60/563,934, filed on Apr. 20, 2004.

(51) Int. Cl.
*B01D 63/00* (2006.01)
(52) U.S. Cl. .......... 210/257.2; 204/600; 210/195.1
(58) Field of Classification Search ........... 210/652, 210/257.2, 195.2; 204/600; 385/129; 427/96; 141/5; 438/623; 264/678
See application file for complete search history.

(56) References Cited

U.S. PATENT DOCUMENTS

| | | | |
|---|---|---|---|
| 6,589,889 B2 * | 7/2003 | Endisch et al. ........... 438/780 |
| 6,797,607 B2 * | 9/2004 | Endisch et al. ........... 438/623 |
| 6,841,068 B1 | 1/2005 | Yoon et al. | |
| 6,843,281 B1 * | 1/2005 | Barth et al. ........... 141/5 |
| 7,220,345 B2 * | 5/2007 | Bohn et al. ........... 204/600 |
| 7,248,771 B2 * | 7/2007 | Schmidt et al. ........... 385/129 |
| 2005/0067341 A1 | 3/2005 | Green et al. | |

OTHER PUBLICATIONS

Martin, C. R., et al., "Nanomaterials in Analytical Chemistry," American Chemical Society, Analytical Chemistry News & Features, May 1998 pp. 322A-327A.
Nishizawa, M., et al., "Metal Nanotubule Membranes with Elecrochemically Switchable Ion-Transport Selectivity," Scence, vol. 268, May 1995, pp. 700-702.
Lee, S.B., et al., "Controlling the Transport Properties of Gold Nanotubule Membranes Using Chemisorbed Thiols," Chem. Mater. 13, 2001, pp. 3236-3244.
Heller, A, "Helping Water Managers Ensure Clean and Reliable Supplies," Lawrence Livermore National Lab., Science & Technology Review, Jul. 2004, 10 pages.
Schaldach, C. M., et al., "Dielectrophoretic Forces on the Nanoscale," Langmuir 20, 2004, pp. 10744-10750.
Heller, A., "Innovative Technologies to Protect Water Supplies," Lawrence Livermore National Laboratory, Science & Technology Review, Jul./Aug. 2004, 11 pages.

* cited by examiner

*Primary Examiner*—Ana M Fortuna
(74) *Attorney, Agent, or Firm*—Eddie E. Scott; John H. Lee

(57) ABSTRACT

A computer designed nanoengineered membrane for separation of dissolved species. One embodiment provides an apparatus for treatment of a fluid that includes ions comprising a microengineered porous membrane, a system for producing an electrical charge across the membrane, and a series of nanopores extending through the membrane. The nanopores have a pore size such that when the fluid contacts the membrane, the nanopores will be in a condition of double layer overlap and allow passage only of ions opposite to the electrical charge across the membrane.

18 Claims, 13 Drawing Sheets

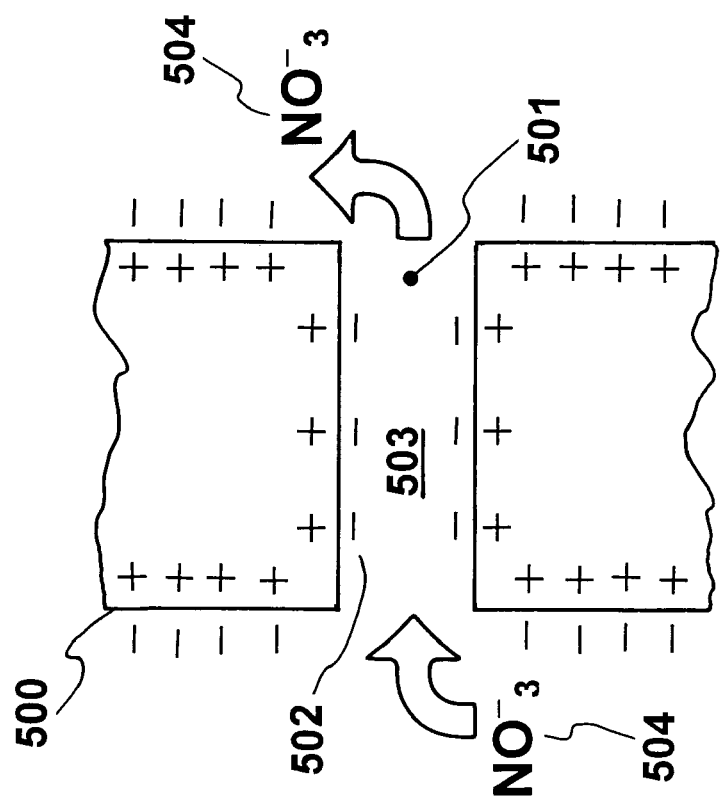
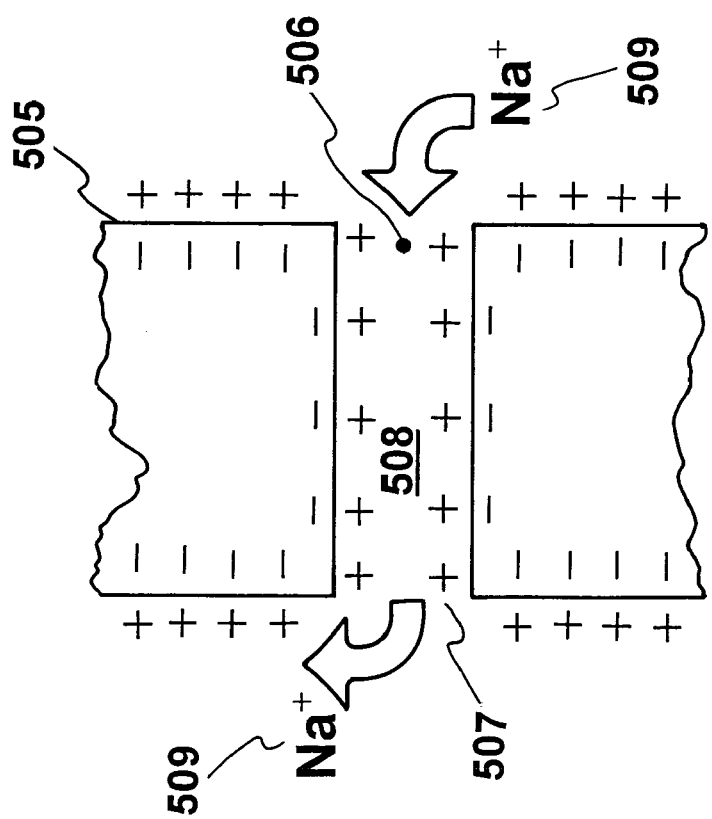
FIG. 5A
FIG. 5B

SMART MEMBRANES FOR NITRATE REMOVAL, WATER PURIFICATION, AND SELECTIVE ION TRANSPORTATION

CROSS-REFERENCE TO RELATED APPLICATIONS

This application claims the benefit of U.S. Provisional Patent Application No. 60/563,934 filed Apr. 20, 2004 by William D. Wilson, Charlene M. Schaldach, William L. Bourcier, and Phil Paul titled "Computer Designed Nanoengineered Materials for Separation of Dissolved Species." U.S. Provisional Patent Application No. 60/563,934 filed Apr. 20, 2004 is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to nanoengineered materials and more particularly to computer designed nanoengineered materials for separation of dissolved species.

2. State of Technology

U.S. patent application Ser. No. 2005/0067341 by Dennis H. Green, George D. Piegols, John A. Lombardi, and Gary Joseph Herbert for a Continuous Production Membrane Water Treatment Plant and Method for Operating Same, published Mar. 31, 2005, provides the following state of technology information, "With water shortages and environmental protection gaining global importance, membrane treatment of contaminated waters is becoming more widespread. Membranes can separate effectively suspended solids, entrained oils and greases, dissolved solids, and dissolved organics, and produce a low contaminant-content permeate water. Membranes can also conserve reagent-loaded matrix waters for recycle and recover valuable metals from metal-loaded waters."

U.S. Pat. No. 6,841,068 to Sung Ro Yoon, Soon Sik Kim, Hoon Hyung, and Young Hoon Kim issued Jan. 11, 2005 for a domestic nanofiltration membrane based water purifier without a storage tank provides the following state of technology information, "In step with industrial progress, water pollution and water resources scarcity are emerging as severe problems. Because of industrial advancement, population growth, and increased standards of living, the demand to good quality water is increasing rapidly. However, water pollution due to domestic waste or industrial sewage has become a serious problem and therefore, available water has become scarce. In order to utilize limited water resources efficiently, purification treatment is absolutely necessary before drinking natural water is to be consumed, in addition to the removal of sources of water pollution. Conventional water purifiers take forms of different kinds of purification systems depending on filter type. At present, the purification system using a filtration membrane is considered to be the most effective because it can eliminate impurities including minute substances such as bacteria and heavy metals. As representative filtration membranes for use in water purifiers, there exist an ultrafiltration membrane, a nanofiltration membrane and a reverse osmosis membrane. Among them, the ultrafiltration membrane is used to remove mainly colloid-sized substances. Although it can provide a high flow rate due to larger pore size than those of the nanofiltration and reverse osmosis membranes, there is a limit to elimination of minute substances such as bacteria and heavy metals."

The article "Helping Water Managers Ensure Clean and Reliable Supplies" in the July/August 2004 issue of *Science & Technology Review* provides the following state of technology information, "One of the most important tasks for California water managers is to protect the purity of groundwater, which supplies about half of the state's drinking water. However, since 1988, about one-third of the state wells that supply public drinking water have been abandoned, destroyed, or inactivated, frequently because they have been contaminated with nitrate from fertilized farmland, dairies, feedlots, and septic tanks."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides computer designed nanoengineered materials for separation of dissolved species. In one embodiment, the present invention provides an apparatus for treatment of a fluid that includes ions comprising a microengineered porous membrane, a system for producing an electrical charge across the membrane, and a series of nanopores extending through the membrane. The nanopores have a pore size such that when the fluid contacts the membrane, the nanopores will be in a condition of double layer overlap and allow passage only of ions opposite to the electrical charge across the membrane. In another embodiment, the present invention provides a method of treatment of a fluid that includes ions. The method comprises the steps of providing a microengineered porous membrane, producing an electrical charge across the membrane, and producing nanopores in the membrane. The nanopores have a pore size such that when the fluid contacts the membrane the nanopores will be in a condition of double layer overlap and allow passage only of ions opposite to the electrical charge across the membrane.

The present invention operates to perform functions such as nitrate removal, water purification, and selective ion transportation. The smart membrane of the present invention provides selective removal of aqueous species from electrolyte solutions. Such a technology could be widely used in the United States because many water supplies have been contaminated by small amounts of toxic substances, such as nitrate, arsenate, perchlorate and others. These substances must be removed before the water can be used for domestic use. The smart membrane of the present invention can be used to extract just those targeted species from the water.

In addition, the smart membrane of the present invention can be used to extract valuable substances from natural or industrial fluids that contain a mixture of species. For example, geothermal fluids contain potentially valuable amounts of lithium that could be marketed provided some technology were available to selectively extract the lithium.

Benefits of the present invention are describe in the article "Helping Water Managers Ensure Clean and Reliable Supplies" in the July/August 2004 issue of *Science & Technology Review*. "In electrodialysis, transport of either positively charged ions (cations) or negatively charged ions (anions) through copolymer membranes is driven by a voltage applied by a pair of flat electrodes. The ions are driven toward the electrode with the opposite charge. Water flows between alternate cation-permeable and anion-permeable copolymer membrane sheets sandwiched between the electrodes and separated by spacers. As water flows between the membranes, salt is removed from one compartment and concentrated in adjacent compartments, with up to a hundred or more membrane pairs per stack. A manifold separates the exiting fluid into a relatively salt-free permeate product and a salt-enriched brine for disposal . . . The membranes have pores drilled to an optimal size for selective removal of the ions of interest. If the system is optimized for nitrate ions, for example, those ions will preferentially pass through the pores, while others remain with the stream of water. The nitrates can then be collected in the waste stream . . . The team is confident the pores also could be used to trap minor contaminants, such as perchlorate molecules, which typically are present in parts-per-billion concentrations. For those applications, the voltage applied to the membranes would be turned up to electrochemically destroy the perchlorate molecules and, thus, eliminate any waste stream. In a similar manner, a membrane could be designed to selectively remove viruses and then deactivate them. Bourcier foresees specialized membranes for the military, such as a unit mounted on a Humvee to purify brackish water for troops in the field, or membranes designed to remove chemical and biological warfare agents from water. The technology could also be used to purify the wastewater from the production of oil, gas, and coal and to recover metals in industrial wastewater and in silicon chip manufacturing."

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 5A illustrates a section of an anion permeable membrane with a nanopore.

FIG. 5B illustrates a section of a cation permeable membrane with a nanopore.

DETAILED DESCRIPTION OF THE INVENTION

Figure 1:
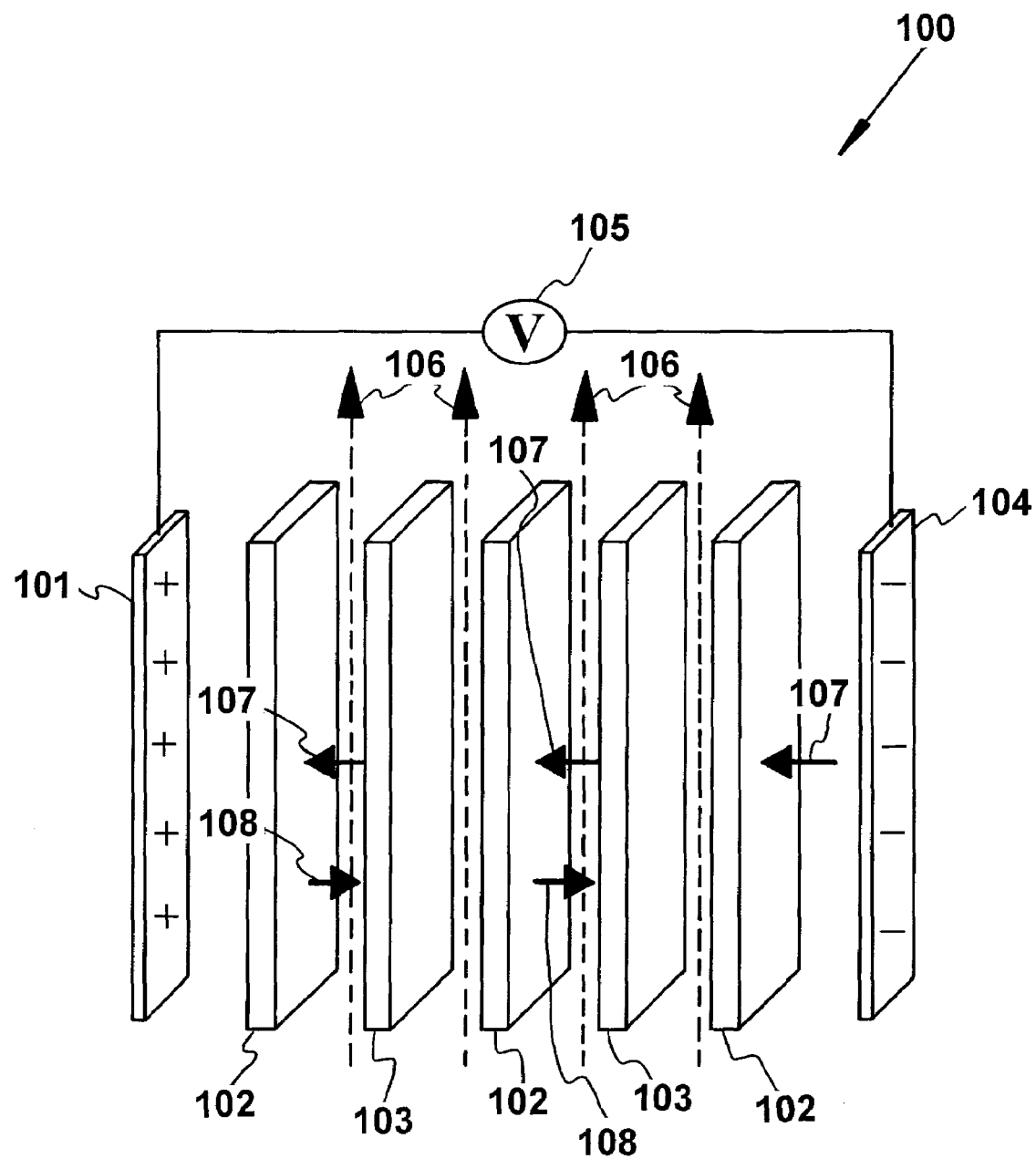
FIG. 1 shows an embodiment of a smart membrane system constructed in accordance with the present invention

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, an embodiment of a smart membrane system constructed in accordance with the present invention is illustrated. The smart membrane system is designated generally by the reference numeral 100. The smart membrane system 100 is constructed using computer results in accordance with the present invention. The smart membrane system 100 includes the following structural elements: a cathode 101, anion permeable membranes 102, cation permeable membranes 103, anode 104 and voltage source 105. The smart membrane system 100 includes anion permeable membranes 102 that have positive surface charge and cation permeable membranes 103 that have negative surface charge.

The smart membrane system 100 operates to perform functions such as nitrate removal, water purification, and selective ion transportation. For example, to provide selectivity for nitrate removal, the anion permeable membranes 102 are nanoengineered to provide relatively rapid nitrate movement through the membrane nanopores. The cation permeable membranes 103 are used for the companion positive charged ions to remove the nitrate salt that could either by re-cycled for use or disposed of.

The smart membrane system 100 comprises a layered stack of membrane materials with through-going pores of a few nanometers in diameter. The pore size is selected such that when exposed to the solution to be treated, the pore will be in a condition of 'double layer overlap' and allow passage only of ions opposite in charge to the membrane surface. The surface charge may either be intrinsic (due to hydrolysis of the material surface), or applied by an external potential on a metalized membrane surface. The charge on the membranes alternates from positive to negative through the membrane stack. An electrical potential gradient is placed across the entire membrane stack and used to drive ions though the membranes. The negative ions are drawn toward the anode 101 as illustrated by the arrows 107. The positive ions are drawn toward the cathode 104 as illustrated by the arrows 108.

The fluid to be treated is pumped through the membranes as illustrated by the arrows 106 and the targeted species and its counter ion is concentrated in alternate cells. A manifold is attached to the distal end of the device and used to collect the separates. The device is similar to existing electrodialysis equipment in some ways but differs in that only the targeted species is drawn through the membrane, rather than all ions of similar charge type. In this respect, the invention uses less energy and produces a much smaller volume of waste.

The smart membrane system 100 is constructed using computer results in accordance with the present invention utilizing a method of calculation of the dielectrophoretic force on a nanoparticle in a fluid environment where variations in the electric field and electric field gradients are on the same nanoscale as the particle. The Boundary Element Dielectrophoretic Force (BEDF) method involves constructing a solvent-accessible or molecular surface surrounding the particle, calculating the normal component of the electric field at the surface boundary elements and then solving a system of linear equations for the induced surface polarization charge on each element. Different surface elements of the molecule may experience quite different polarizing electric fields, unlike the situation in the point dipole approximation. A single 100 Å radius ring test configuration is employed to facilitate comparison with the well-known point dipole approximation (PDA). The membrane system 100 utilizes agreement between the forces calculated by the BEDF and PDA methods for a 1 Å polarizable sphere. For larger particles, the differences between the methods become qualitative as well as quantitative; the character of the force changes from attractive at the origin of the ring for a 50 Å sphere, to repulsive for a 75 Å sphere. Equally dramatic differences are found in a more complex electrical environment involving two sets of 10 rings.

Dielectrophoresis is increasingly being employed to manipulate and separate molecules and particles including biological cells. Recent developments in nanotechnology enable structures to be built which can create fields and field gradients on unprecedented length scales; the scale of the variations in the field inducing charge on a molecule may be the same as the scale of the molecule itself. Synthetic nanopores have been fabricated in inorganic materials for transporting DNA. Carbon nanotubes have been aligned in a polymer film to demonstrate molecular transport through their cores. Dielectrophoresis has recently been employed to assemble nanowires in suspensions. Multilayer technology enables materials comprised of virtually any elements to be constructed with control on atomic dimensions.

The smart membrane system 100 provides a method for calculation of dielectrophoretic forces in situations where the scale of the variations in the field inducing charge on a molecule may be the same as the scale of the molecule, and whose molecular shape may not be spherical. The results are compared to the analytic (pointdipole approximation, PDA) expressions for the dielectrophoretic force.

The dielectrophoretic force, F, on a dipole, p, in a nonuniform field, E, is given by $$F = (p \cdot \nabla) E \qquad [1]$$

For a sphere of radius R having internal dielectric constant $\varepsilon_2$ in a dielectric medium of dielectric constant $\varepsilon_1$, the effective dipole moment is $$p = 2\pi R^3 \varepsilon_1 \left( \frac{\varepsilon_2 - \varepsilon_1}{\varepsilon_2 + 2\varepsilon_1} \right) E \qquad [2]$$

where $$\frac{\varepsilon_2 - \varepsilon_1}{\varepsilon_2 + 2\varepsilon_1}$$

is the well-known Clausius-Mossotti factor for a sphere. The dielectrophoretic force in the point-dipole approximation (PDA) becomes $$F = 2\pi R^3 \varepsilon_1 \left( \frac{\varepsilon_2 - \varepsilon_1}{\varepsilon_2 + 2\varepsilon_1} \right) \nabla |E|^2 \qquad [3]$$

Equation 3 is applicable to a "small" sphere (although not a point dipole, since it has finite radius, R) in a field, E, which field is assumed to be nonuniform enough to produce appreciably different charges on the positive and negative regions of the induced surface polarization charges, but which nevertheless does not vary so strongly as to alter the size of the dipole throughout the sphere. The dielectrophoretic force calculated using Equation 3 does assume the molecule ("molecule" and "particle" are equivalent for Applicants purposes here) to be a dipole: the magnitudes of the positive and negative induced polarization charges are equal. Equation 3 is recognized as being applicable to the force on a molecule when the dimensions of the variations in the electrostatic potentials and fields are small compared to molecular dimensions.

An alternative expression for the force on a molecule is $$F = \int \sigma(s) ds \qquad [4]$$

where $\sigma(s)$ is the induced surface charge density on an element, s, of the molecular surface and E(s) is the electric field at the surface element having elemental area ds. Equation 4 a) is applicable to arbitrary molecular geometry, b) allows for unequal magnitudes of positive and negative charge to be induced (unlike the dipole approximation), and c) takes account of the precise electric field and, hence, field gradient at every element of the molecule. A molecule whose surface elements experience electric fields whose gradients are not representable by the gradient at say, the centroid, may not be able to be represented by the dipole approximation. Given the charges induced on the surface elements, the energy, W, required to bring the molecule from infinity (a position where the field or field gradient is zero) to its position in the nanostructure is given by $$W = \frac{1}{2} \int \phi(s) ds \qquad [5]$$

where $\phi(s)$ is the electrostatic potential at the molecular surface element s.

The smart membrane system 100 provides a method of calculation, the Boundary Element Dielectrophoretic Force (BEDF) method, involves first constructing a molecular or solvent accessible surface surrounding the molecule by a method Applicants have previously described. This surface provides the interface between the dielectric media and the molecule; elements of the surface are assigned a unit normal and an elemental area. The electric field, E, created by the nanostructure provides a source of polarization of the molecule. The induced interfacial charge, $\sigma$, can be obtained from a straightforward consideration of the electrostatic boundary conditions and self-terms. This leads to a system of linear equations, $$\{[I] - f[K]\}[\sigma] = f[E \cdot n] \quad [6]$$

where $$K_{ik} = \int \frac{r_{ik} \cdot n_i}{|r_{ik}|^3} \quad [7]$$

$r_{ik}$ is the vector distance between elements i and k on the molecular boundary; ni is the outward normal at boundary element i; dSk is the differential associated with the area of boundary element k; E·n is the column vector of normal components of the electric field. f is given by, ($\in 2*$=1.0 here, but is not restricted to this) and 1 **is the dielectric constant of the solvent ($\in 1*$=78.5 for water here, but, again, is not restricted to this.).

Solution of Equation by the usual methods of linear algebra provides the polarization charge, σ, created by E at each surface element. In this way, different surface elements of the molecule are allowed to experience quite different polarizing electric fields, unlike the situation in the point dipole approximation. The field gradient, variations in the field over the scale of the molecule, is properly taken into account.

A simple charged ring of radius R=100 Å provides an interesting test case. The axial electric field has variations over length scales of the order of its radius which serve to illustrate several important features. The potentials and fields can be calculated analytically and can also be obtained numerically by constructing the ring of small Debye-Huckel atoms (spheres) and performing a direct summation of their individual contributions. The membrane system 100 provides the numerical method to facilitate investigation into more complicated structures to be described below. In these demonstration calculations, each atomic element of the ring was given a charge of 0.1 electrons; the magnitude of the fields and forces in this test case are small but obviously scale with the charge.

The membrane system 100 provides a method for calculation of the dielectrophoretic force on a nanoparticle in a fluid environment where variations in the electric field and electric field gradients are on the same nanoscale as the particle. The Boundary Element Dielectrophoretic Force (BEDF) method involves constructing a solvent-accessible or molecular surface surrounding the particle, calculating the normal component of the electric field at the surface boundary elements and then solving a system of linear equations for the induced surface polarization charge on each element. Different surface elements of the molecule may experience quite different polarizing electric fields, unlike the situation in the point dipole approximation. A single 100 Å radius ring test configuration is employed to facilitate comparison with the well-known point dipole approximation (PDA). Applicants find remarkable agreement between the forces calculated by the BEDF and PDA methods for a 1 Å polarizable sphere. However, for larger particles, the differences between the methods become qualitative as well as quantitative; the character of the force changes from attractive at the origin of the ring for a 50 Å sphere, to repulsive for a 75 Å sphere. Equally dramatic differences are found in a more complex electrical environment involving two sets of 10 rings.

Figure 2:
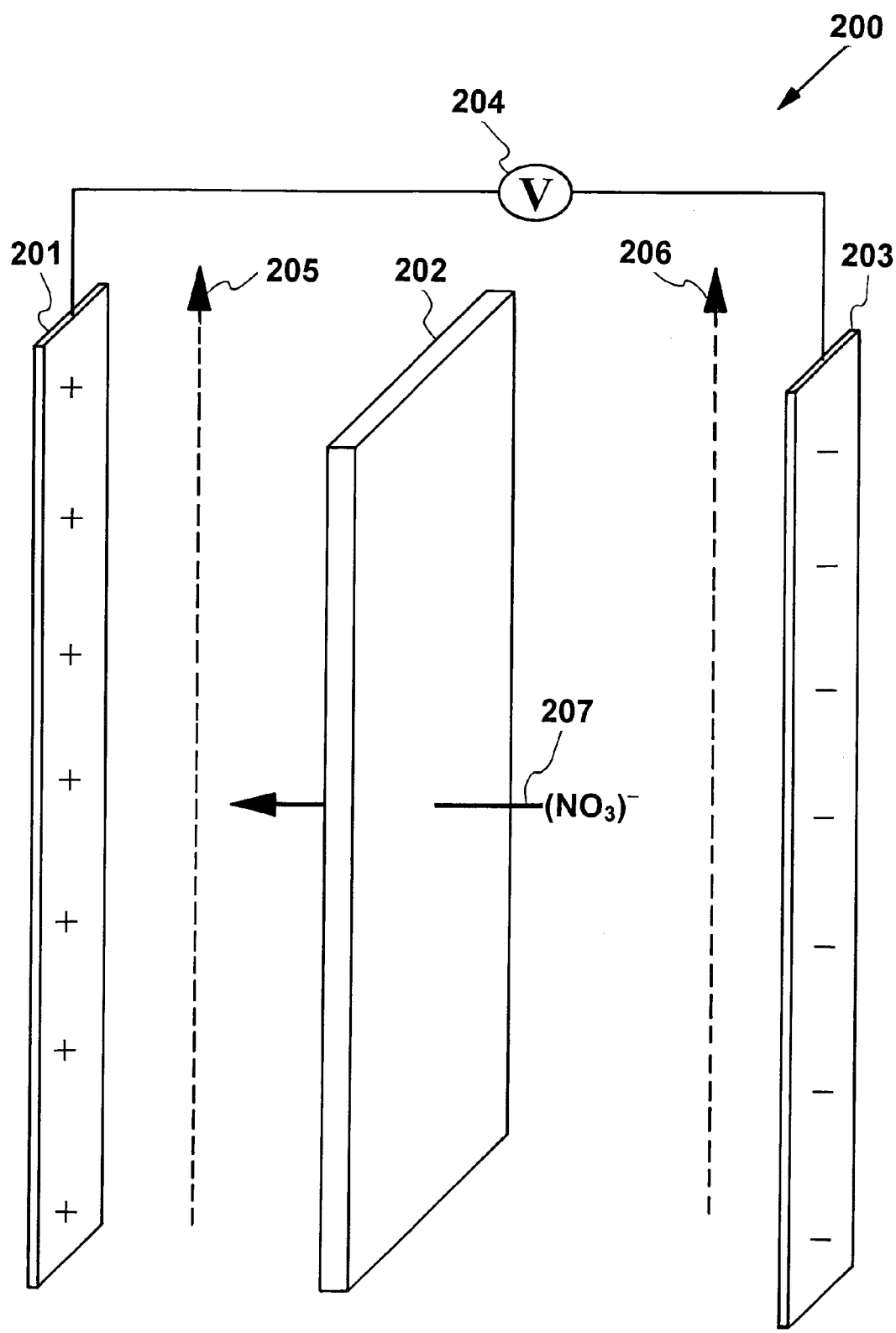
FIG. 2 shows another embodiment of a smart membrane system constructed in accordance with the present invention that provides selectivity for nitrate removal from water.

Referring now to FIG. 2, another embodiment of a smart membrane system constructed in accordance with the present invention is illustrated. This embodiment of a smart membrane system is designated generally by the reference numeral 200. The smart membrane system 200 provides selectivity for nitrate removal from water.

The article "*Helping Water Managers Ensure Clean and Reliable Supplies*" in the July/August 2004 issue of *Science & Technology Review* states, "Most Americans take cheap and plentiful supplies of pure drinking water for granted. Some even consider it to be an inalienable right. However, clean water sources, especially pristine underground aquifers, are being consumed at an increasing rate, and contaminants and changing patterns in rain and snowfall are threatening the adequacy of supplies . . . One of the most important tasks for California water managers is to protect the purity of groundwater, which supplies about half of the state's drinking water. However, since 1988, about one-third of the state wells that supply public drinking water have been abandoned, destroyed, or inactivated, frequently because they have been contaminated with nitrate from fertilized farmland, dairies, feedlots, and septic tanks.

Nitrate, a nitrogen-oxygen compound, is a significant source of nitrogen, an essential nutrient. However, high levels of nitrate in drinking water can cause serious illness and sometimes death. Nitrate poses a special risk for infants. It can diminish the oxygen-carrying capacity of an infant's blood (called blue baby syndrome), which can lead to death. High nitrate levels can also harm the ecosystems of lakes, streams, and the coastal ocean."

The smart membrane system 200 includes the following structural elements: a cathode 201, an anion permeable membrane 202, an anode 203, and a voltage source 204. The anion permeable membrane 202 is nanoengineered to provide relatively rapid nitrate movement through the membrane nanopores. The membrane system 200 utilizes the permeable membrane 202 made of a membrane material with through-going pores of a few nanometers in diameter. The membrane 202 is produce by drilling pores through the membrane. The pores are drilled to an optimal size for selective removal of the ions of interest. The pore size is selected such that when the water to be treated is passed along the permeable membrane 202, the pores will be in a condition of "double layer overlap" and allow passage only of ions opposite in charge to the membrane surface.

The smart membrane system 200 is constructed using computer results in accordance with the present invention utilizing a method of calculation of the dielectrophoretic force on a nanoparticle in a fluid environment where variations in the electric field and electric field gradients are on the same nanoscale as the particle. The Boundary Element Dielectrophoretic Force (BEDF) method involves constructing a solvent-accessible or molecular surface surrounding the particle, calculating the normal component of the electric field at the surface boundary elements and then solving a system of linear equations for the induced surface polarization charge on each element.

The smart membrane system 200 provides a method for calculation of the dielectrophoretic force on a nanoparticle in a fluid environment where variations in the electric field and electric field gradients are on the same nanoscale as the particle. The Boundary Element Dielectrophoretic Force (BEDF) method involves constructing a solvent-accessible or molecular surface surrounding the particle, calculating the normal component of the electric field at the surface boundary elements and then solving a system of linear equations for the induced surface polarization charge on each element. Different surface elements of the molecule may experience quite different polarizing electric fields, unlike the situation in the point dipole approximation. A single 100 Å radius ring test configuration is employed to facilitate comparison with the well-known point dipole approximation (PDA).

The voltage source 204 is used to crate an electrical potential gradient across the membrane 202 and used to drive the nitrate ions $(NO_3)^-$ though the membrane 202 as illustrated by the arrow 207. The nitrate ions $(NO_3)^-$ are drawn toward the cathode 101 as illustrated by the arrow 107.

The fluid to be treated is pumped through the smart membrane system 200. The targeted species nitrate ions $(NO_3)^-$ is drawn through the permeable membrane 202 and produces the fluid flow 205 that is a nitrate enriched brine. The nitrate depleted water continues through the membrane system 200 as illustrated by the arrow 206. The voltage source 204 is used to crate an electrical potential gradient across the membrane 202 and used to drive the nitrate ions $(NO_3)^-$ though the membrane 202 as illustrated by the arrow 207. The nitrate ions $(NO_3)^-$ are drawn toward the cathode 101 as illustrated by the arrow 107. The fluid to be treated is pumped through the smart membrane system 200. The targeted species nitrate ions $(NO_3)^-$ is drawn through the permeable membrane 202 and produces the fluid flow 205 that is a nitrate enriched brine. The nitrate depleted water continues through the membrane system 200 as illustrated by the arrow 206. In the membrane system 200 the pores are created with an etching process using ion-beam technology. For nitrate treatment, the membrane pores are about 10 nanometers in diameter. Current membrane samples contain about 1 billion holes per square centimeter.

Figure 3:
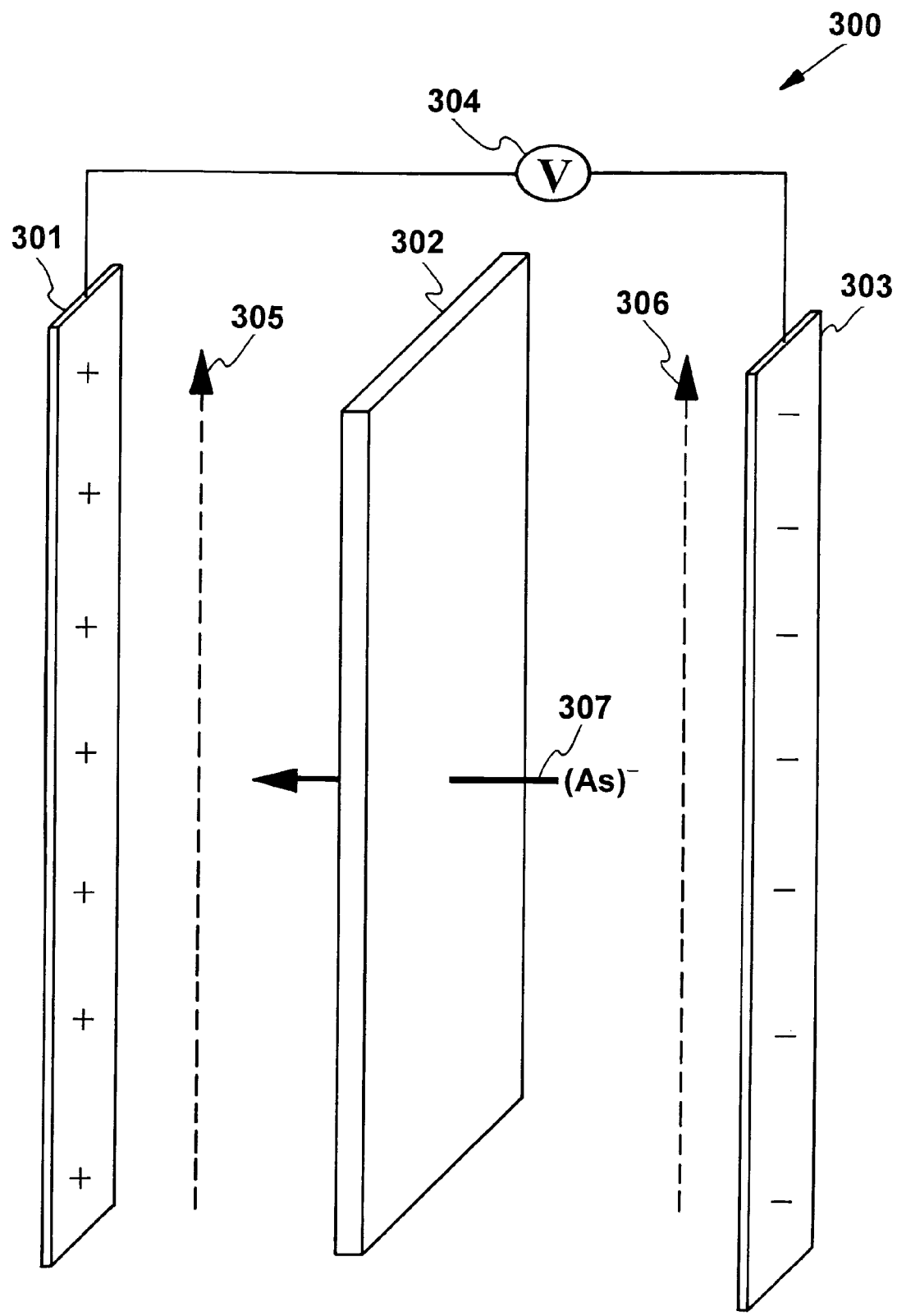
FIG. 3 shows another embodiment of a smart membrane system constructed in accordance with the present invention that provides selectivity for arsenic removal from water.

Referring now to FIG. 3, another embodiment of a smart membrane system constructed in accordance with the present invention is illustrated. This embodiment of a smart membrane system is designated generally by the reference numeral 300. The smart membrane system 300 provides selectivity for arsenic removal from water.

The smart membrane system 300 includes the following structural elements: a cathode 301, a permeable membrane 302, an anode 303, and a voltage source 304. The permeable membrane 302 is nanoengineered to provide relatively rapid arsenic movement through the membrane nanopores. The smart membrane system 300 utilizes the permeable membrane 302 made of a membrane material with through-going pores of a few nanometers in diameter. The membrane 302 is produce by drilling pores through the membrane. The pores are drilled to an optimal size for selective removal of the ions of interest.

The pore size is selected such that when the water to be treated is passed along the permeable membrane 302, the pores will be in a condition of "double layer overlap" and allow passage only of ions opposite in charge to the membrane surface.

The smart membrane system 300 is constructed using computer results in accordance with the present invention utilizing a method of calculation of the dielectrophoretic force on a nanoparticle in a fluid environment where variations in the electric field and electric field gradients are on the same nanoscale as the particle. The Boundary Element Dielectrophoretic Force (BEDF) method involves constructing a solvent-accessible or molecular surface surrounding the particle, calculating the normal component of the electric field at the surface boundary elements and then solving a system of linear equations for the induced surface polarization charge on each element.

The smart membrane system 300 provides a method for calculation of the dielectrophoretic force on a nanoparticle in a fluid environment where variations in the electric field and electric field gradients are on the same nanoscale as the particle. The Boundary Element Dielectrophoretic Force (BEDF) method involves constructing a solvent-accessible or molecular surface surrounding the particle, calculating the normal component of the electric field at the surface boundary elements and then solving a system of linear equations for the induced surface polarization charge on each element. Different surface elements of the molecule may experience quite different polarizing electric fields, unlike the situation in the point dipole approximation. A single 100 Å radius ring test configuration is employed to facilitate comparison with the well-known point dipole approximation (PDA).

The voltage source 304 is used to crate an electrical potential gradient across the membrane 302 and used to drive the arsenic ions $(As)^-$ though the membrane 302 as illustrated by the arrow 307. The arsenic ions $(As)^-$ are drawn to the cathode 101 as illustrated by the arrow 107.

The fluid to be treated is pumped through the smart membrane system 300. The targeted species arsenic ions $(As)^-$ is drawn through the permeable membrane 302 and produces the fluid flow 305 that is an arsenic enriched brine. The arsenic depleted water continues through the smart membrane system 300 as illustrated by the arrow 306.

Figure 4:
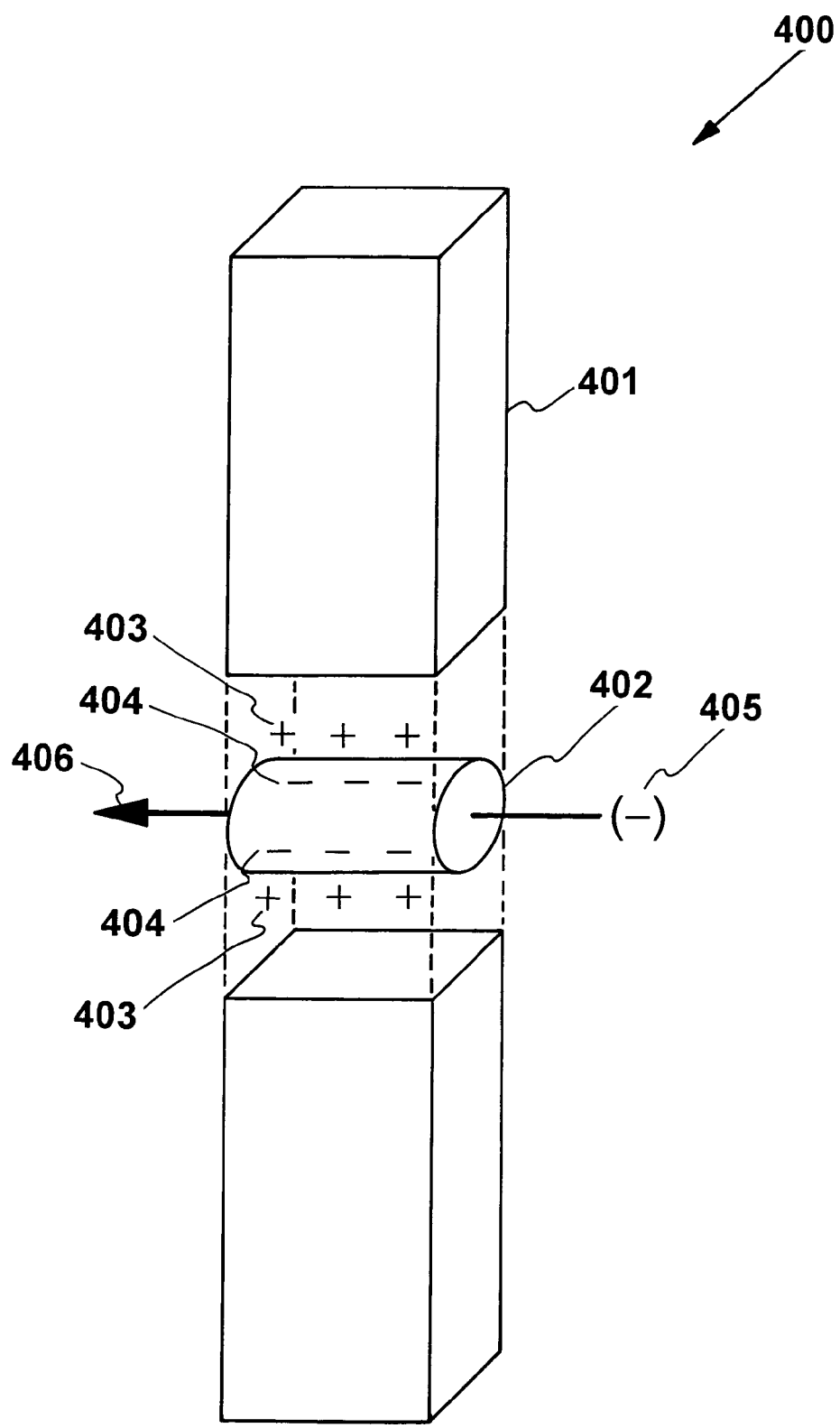
FIG. 4 illustrates a section of a smart membrane with a nanopore.

Referring now to FIG. 4, a section of a smart membrane with a nanopore is illustrated. This illustration of a smart membrane with a nanopore is designated generally by the reference numeral 400. The smart membrane with a nanopore 400 includes a permeable membrane 401 and a nanopore 403.

The smart membrane with a nanopore 400 is nanoengineered to provide relatively rapid ion movement through the nanopore 402. The nanopore 402 is a few nanometers in diameter. Pore diameter smaller than double-layer thickness causes "double layer overlap" and results in ion permselectivity. Negative surface charge allows transport of positive ions. Positive surface charge allows transport of negative ions. The pore size is selected such that when the fluid to be treated is passed along the permeable membrane 401, the nanopore 402 will be in a condition of "double layer overlap" and allow passage only of ions opposite in charge to the charge of the membrane 401. As illustrated, the negative ion 405 passes through the nanopore 402 as indicated by the arrow 406.

Referring again to FIG. 4, the permeable membrane 401 is an anion permeable membrane with a positive charge. The positive charge of the permeable membrane 401 is indicated at 403. This produces negative charges inside the nanopore 402. The negative charges inside the nanopore 402 are identified at 404. The pore size has been selected such that the nanopore 402 is in a condition of "double layer overlap" and allows passage only of negative ions 405. The negative charges inside the nanopore 402 are in a condition of "double layer overlap." There are no positive charges inside the nanopore 402. The negative charges 404 are so close together they prevent positive ions from passing through the nanopore 402.

The nanopore 402 size has been selected using computer results in accordance with the present invention utilizing a method of calculation of the dielectrophoretic force on a nanoparticle in a fluid environment where variations in the electric field and electric field gradients are on the same nanoscale as the particle. The Boundary Element Dielectrophoretic Force (BEDF) method involves constructing a solvent-accessible or molecular surface surrounding the particle, calculating the normal component of the electric field at the surface boundary elements and then solving a system of linear equations for the induced surface polarization charge on each element.

The present invention provides a method for calculation of the dielectrophoretic force on a nanoparticle in a fluid environment where variations in the electric field and electric field gradients are on the same nanoscale as the particle. The Boundary Element Dielectrophoretic Force (BEDF) method involves constructing a solvent-accessible or molecular surface surrounding the particle, calculating the normal component of the electric field at the surface boundary elements and then solving a system of linear equations for the induced surface polarization charge on each element. Different surface elements of the molecule may experience quite different polarizing electric fields, unlike the situation in the point dipole approximation. A single 100 Å radius ring test configuration is employed to facilitate comparison with the well-known point dipole approximation (PDA).

As explained previously, the smart membrane system operates by the voltage source creating an electrical potential gradient across the permeable membrane 401 and the electrical potential gradient is used to drive the ions 405 though the nanopore 402 in the permeable membrane 401 as illustrated by the arrow 406. The article "*Helping Water Managers Ensure Clean and Reliable Supplies*" in the July/August 2004 issue of *Science & Technology Review* describes the smart membranes, "Livermore's modified electrodialysis technology replaces the solid polystyrene membranes with "smart" membranes of gold-coated polycarbonate. By specifying the pore size, voltage, and electric field that will best attract and isolate a target contaminant, researchers can design each membrane to selectively remove only one contaminant of interest . . . Pores Drilled in Smart Membranes—The membranes have pores drilled to an optimal size for selective removal of the ions of interest. If the system is optimized for nitrate ions, for example, those ions will preferentially pass through the pores, while others remain with the stream of water. The nitrates can then be collected in the waste stream." The article "*Helping Water Managers Ensure Clean and Reliable Supplies*" in the July/August 2004 issue of *Science & Technology Review* is incorporated herein by reference.

Referring now to FIGS. 5A and 5B sections of smart membranes are shown with each smart membrane illustrating a nanopore constructed in accordance with the present invention. FIG. 5A is an illustrations of a section of an anion permeable membrane with a nanopore. FIG. 5B is an illustration of a section of a cation permeable membrane with a nanopore. The fluid to be treated is pumped into contact with the membranes and the targeted species ion and its counter ion are concentrated by passing through the nanopore in the anion permeable membrane and the nanopore in the cation permeable membrane respectively.

Referring now to FIG. 5A, a smart anion permeable membrane is designated by the reference numeral 500. The anion permeable membrane 500 includes nanopores. A nanopore 501 is shown for illustration purposes.

The anion permeable membrane 500 has a positive charge. The positive charge of the anion permeable membrane 500 is indicated at 502. The positive charge 502 of the anion permeable membrane 500 produces negative charges inside the nanopore 501. The negative charges inside the nanopore 501 are indicated at 503. The pore size has been selected such that the nanopore 501 is in a condition of "double layer overlap" and allows passage only of negative ions such as the $NO_3$ ion 504. The negative charges 503 inside the nanopore 501 are shown in the condition of "double layer overlap." There are no positive charges inside the nanopore 501. The negative charges 503 are so close together they prevent positive ions from passing through the nanopore 501.

Referring now to FIG. 5B, a smart cation permeable membrane is designated by the reference numeral 505. The cation permeable membrane 505 includes nanopores. A nonopore 506 is shown for illustration purposes.

The cation permeable membrane 505 has a negative charge. The negative charge of the cation permeable membrane 505 is indicated at 507. The negative charge 507 of the cation permeable membrane 505 produces positive charges inside the nanopore 506. The positive charges inside the nanopore 506 are indicated at 508. The pore size has been selected such that the nanopore 506 is in a condition of "double layer overlap" and allows passage only of negative ions such as the Na ion 509. The positive charges 508 inside the nanopore 501 are shown in the condition of "double layer overlap." There are no negative charges inside the nanopore 506. The positive charges 508 are so close together they prevent negative ions from passing through the nanopore 506.

Referring again to FIGS. 5A and 5B, the smart membranes 500 and 505 provide selective removal of aqueous species from an electrolyte fluid. The fluid to be treated is pumped into contact with the membranes 500 and 505 and the targeted species $NO_3$ ion 504 and its counter Na ion 509 are concentrated by passing through the nanopores 501 and 506. The anion permeable membrane 500 has a positive charge 502. The positive charge 502 of the anion permeable membrane 500 produces negative charges 503 inside the nanopore 501. The negative charges 503 are in a condition of "double layer overlap" and allow passage only of negative ions such as the $NO_3$ ion 504. The cation permeable membrane 505 has a negative charge 507. The negative charge 507 of the cation permeable membrane 505 produces positive charges 508 inside the nanopore 506. The positive charges 508 are in a condition of "double layer overlap" and allow passage only of negative ions such as the Na ion 509.

Figure 6:
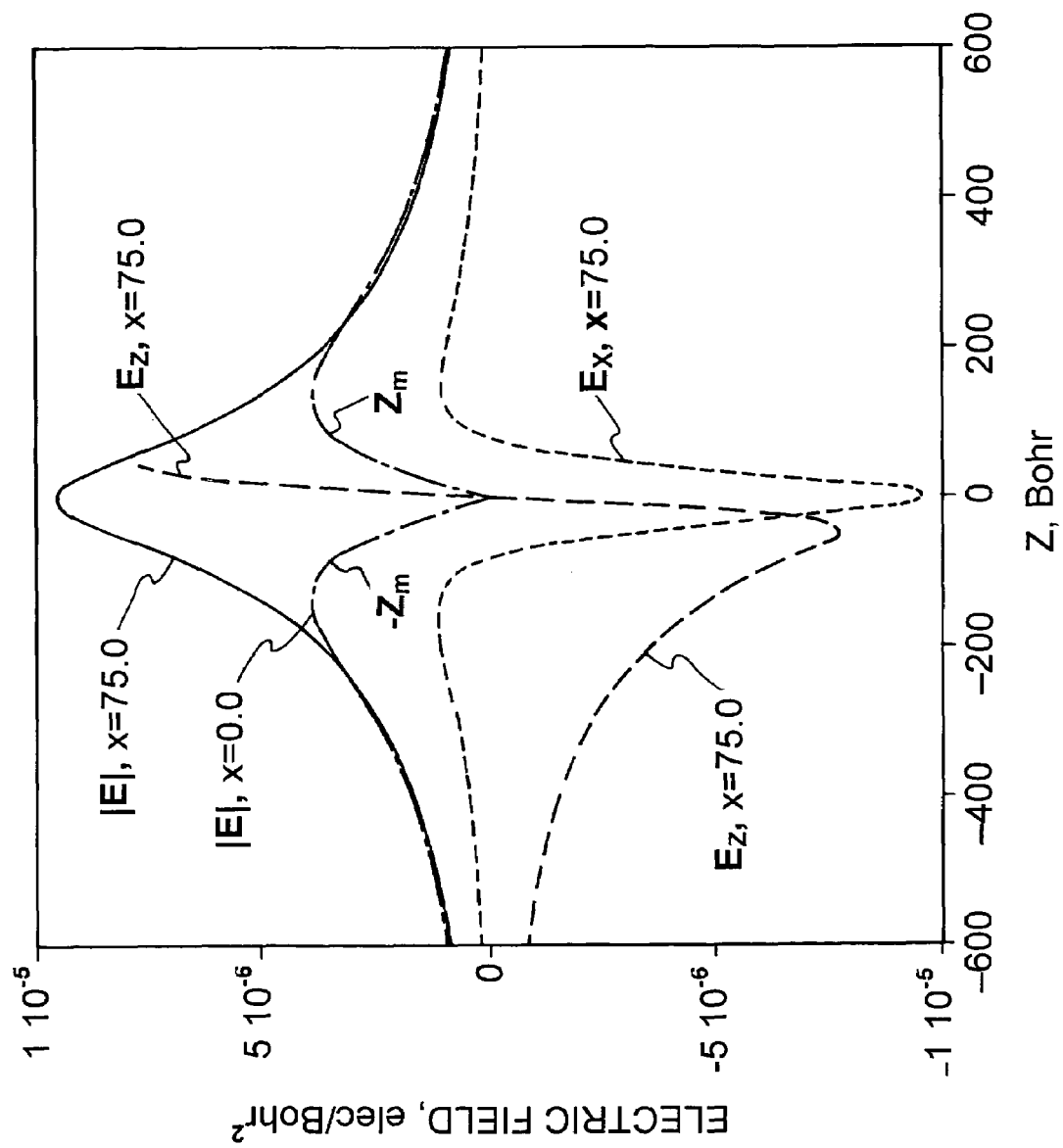
FIG. 6 is a plot illustrating the magnitude of the electric field due to a charged ring of radius R=100 Å as a function of the distances along its axes.

Referring now to FIG. 6, a plot illustrates the magnitude of the electric field, |E|, due to a charged ring of radius R=100 Å as a function of the distance, z, a) along its axis, x=y=0.0 (solid line, filled circles) and also b) along an axis at x=75.0 Å, y=0 (solid line alone). Note that |E| along the x=0 axis has maxima at zm=±(sqrt(2)/2)R (~70.7 Å); along the x=75.0 Å axis, a single maximum in |E| is seen at z=0.0. This shift in the peak of the magnitude of the field is caused by the increase in the off-axis x-component at x=75.0 Å (short-dashed line). The z-component of the electric field along the x=75.0 Å axis (long-dashed line), changes sign at z=0 and has its own extrema at ±25.4 Å (±48 Bohr); nevertheless, the x-component, peaked at z=0.0, dominates the field magnitude off-axis (x=75.0 Å).

FIG. 6, also shows that the x-component also exhibits small peaks at z=84.1 Å (150 Bohr). (The y-component of the electric field is zero in both cases because of the symmetry.) The z-component of the electric field along the x=75.0 Å axis, also shown in FIG. 6 (long-dashed line), changes sign at z=0 and has its own extrema at ±25.4 Å (±48 Bohr); nevertheless, the x-component, peaked at z=0.0, dominates the field magnitude off-axis (x=75.0 Å).

Next, the dielectrophoretic force (DF) on a sphere of radius Rm=1 Å was calculated as a function of its axial distance, z, along the ring axis (x=y=0.0) using both the point-dipole approximation (PDA, Equation 3 above) and the BEDF method (Equation 4 above).

Figure 7:
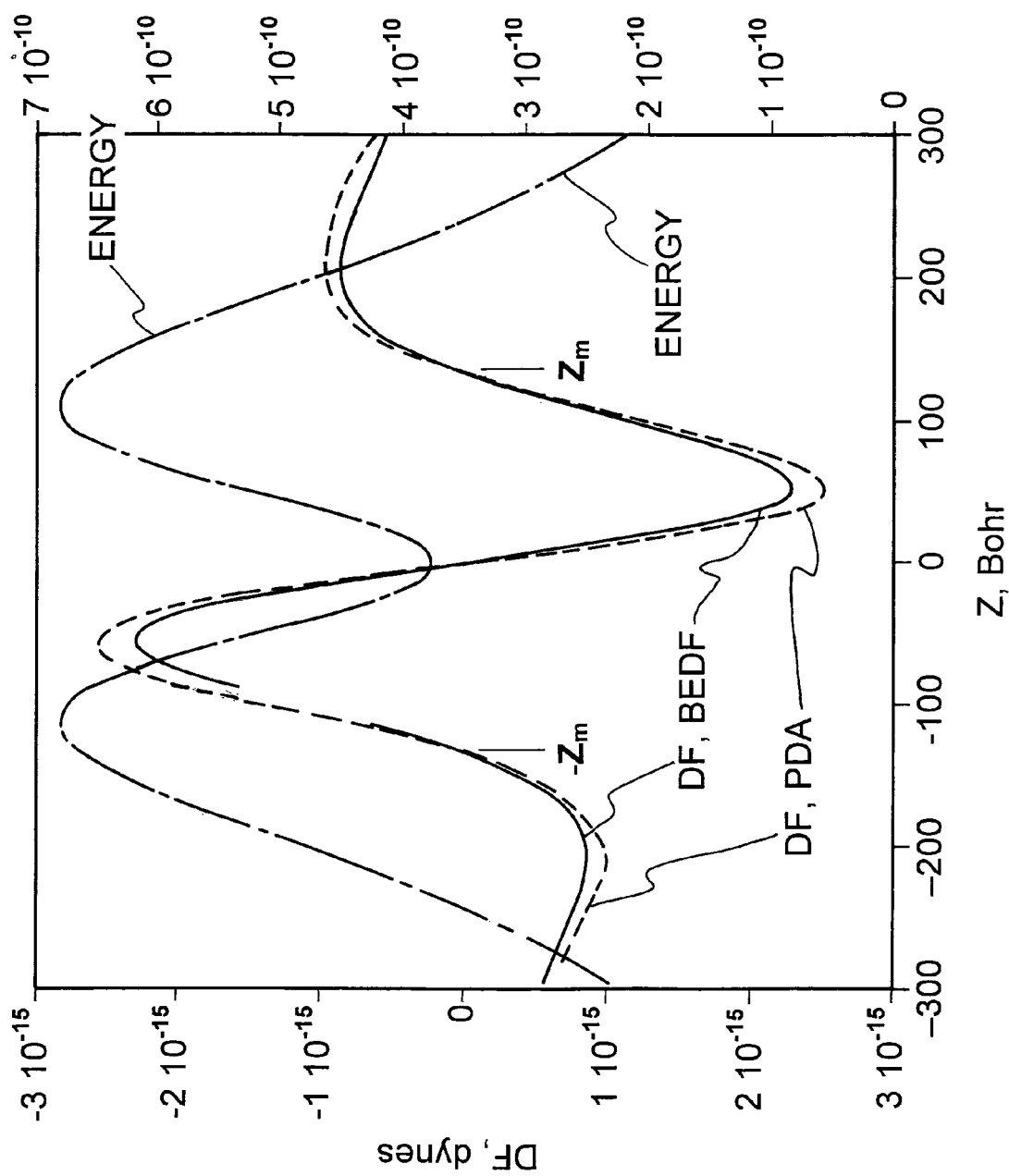
FIG. 7 is a plot showing a comparison.

The results of this comparison are shown in FIG. 7. It is first of all to be noted that, for this small molecule, these very different methods of calculation are in remarkable agreement with each other. The DF is negative for small z>0 (molecule is being attracted backward toward the ring center) and positive for small z<0 (molecule is being attracted toward the ring center) indicating that the molecule is trapped at the ring center. In the region −zm<z<zm, the induced polarization charge on the surface elements of the sphere nearest the ring center is found by direct solution to Equation 6 to be positive, while those elements furthest from the ring are determined to be negatively charged. The electric field in this region is growing in magnitude (see FIG. 4) and, although there is an excess of positive charge induced (more about this below) the force on the negative charge exceeds that on the positive charge, making the total force negative as indicated in FIG. 7. When the molecule is along the z-axis at z>zm, the sign of the induced polarization charges is as for z<zm but now the magnitude of the electric field is diminishing. Consequently, the positive surface charge interacts with a larger electric field and the total force on the molecule becomes positive. Note from FIG. 7 that this occurs at z=zm where the peak in the magnitude of the electric field, |E|, is seen to occur (see FIG. 6). Similar effects occur at z<−zm. Whereas the region near the ring origin is attractive, the region near the extrema in the electric field is repulsive. The dielectrophoretic energy calculated from the induced charges and the electrostatic potential (Equation 7 above), also plotted in FIG. 7 (solid line, open circles) reflects these effects: For example, a minimum in the energy is seen to occur where the force has a negative slope as it goes through zero, but an energy maximum occurs when the force goes through zero with positive slope.

Note, from FIG. 7, there are deviations between the point-dipole and BEDF methods near the extrema. The point-dipole approximation gives consistently larger magnitude forces than the BEDF method. This deviation is caused by the dipole (equal positive and negative charges) approximation. Applicants find that for −zm<z<zm there is an excess of positive charge induced (resulting from the x-component of the field) on the elements nearest the origin while for |z|>zm an excess of negative charge is induced on those elements furthest from the origin. These excess charges in each case interact with the lower magnitude electric field at those elements, thus leading to a slightly reduced force. This excess charge effect becomes more serious for larger molecules (particles), as will be see.

Figure 8:
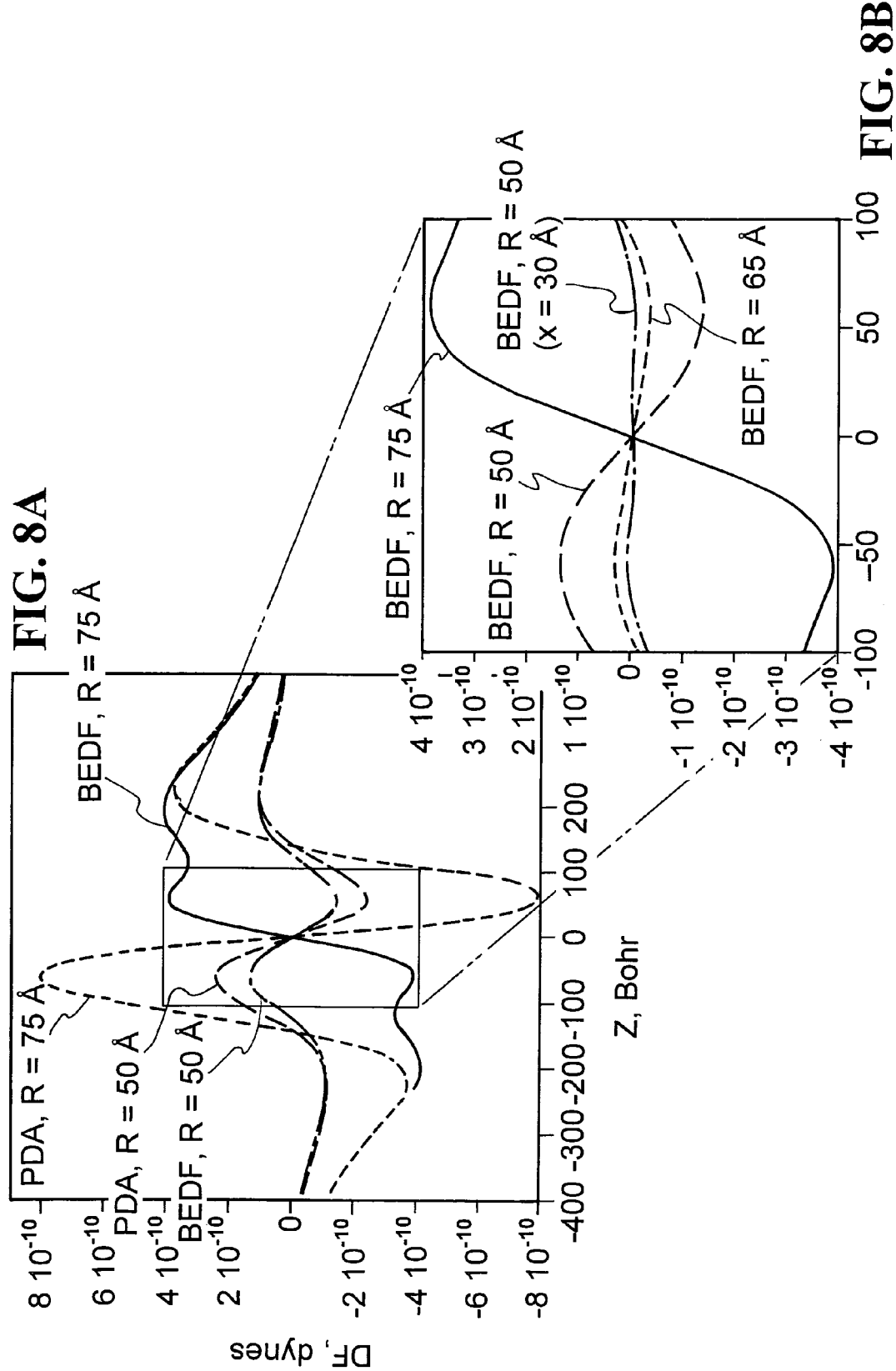
FIG. 8A is a plot showing dielectrophoretic force.
FIG. 8B illustrates that the slope of the force vs distance curve changes sign.

In FIG. 8A, a plot shows the dielectrophoretic force on spheres of radius 50 Å and 75 Å as a function of distance, z, along the ring axis (x=y=0), again calculated in the pointdipole approximation (PDA) and by the BEDF method. The two methods give similar characteristics, albeit different magnitudes, for the 50 Å sphere: Positive force for small z<0 and negative force for small z>0 as found for the 1 Å sphere in FIG. 5. As for the 1 Å sphere, the point-dipole approximation predicts higher magnitude forces because of the x-component of the off-axis electric field at the molecular surface elements. At x=75 Å, the surface elements of the sphere experience dramatically different electric fields (even a shift in the peaks of |E|: see FIG. 8) which dramatically change the character of the dielectrophoretic force. FIG. 8A illustrates that the slope of the force vs distance curve changes sign. This is a quantitative and qualitative change in the force from attractive for the 50 Å molecule to repulsive for the 75 Å molecule. The PDA predicts both molecules to be attracted toward the center. In addition, the PDA predicts repulsion at the peaks in the field, i.e., the slope of the DF vs distance curve is positive as the force goes through zero, while the BEDF method exhibits no such repulsive behavior at the peaks.

FIG. 8B is an expanded inset region noted in FIG. 8A for 50 Å and 75 Å spheres and include the dielectrophoretic force for a 65 Å sphere. This intermediate-sized sphere shows a weak attraction, reduced by an order of magnitude from the force on the 50 Å sphere and shows the transition in the slope of the force taking place as a function of sphere radius. It is interesting to note from FIG. 8B that the dielectrophoretic force on a 50 Å sphere moved along z at the x=30 Å off-axis position exhibits similar behavior to the 65 Å sphere moved on-axis. As the off-center sphere moves far from the ring center (not shown), it follows the behavior for the 50 Å on-axis sphere.

Figure 9:
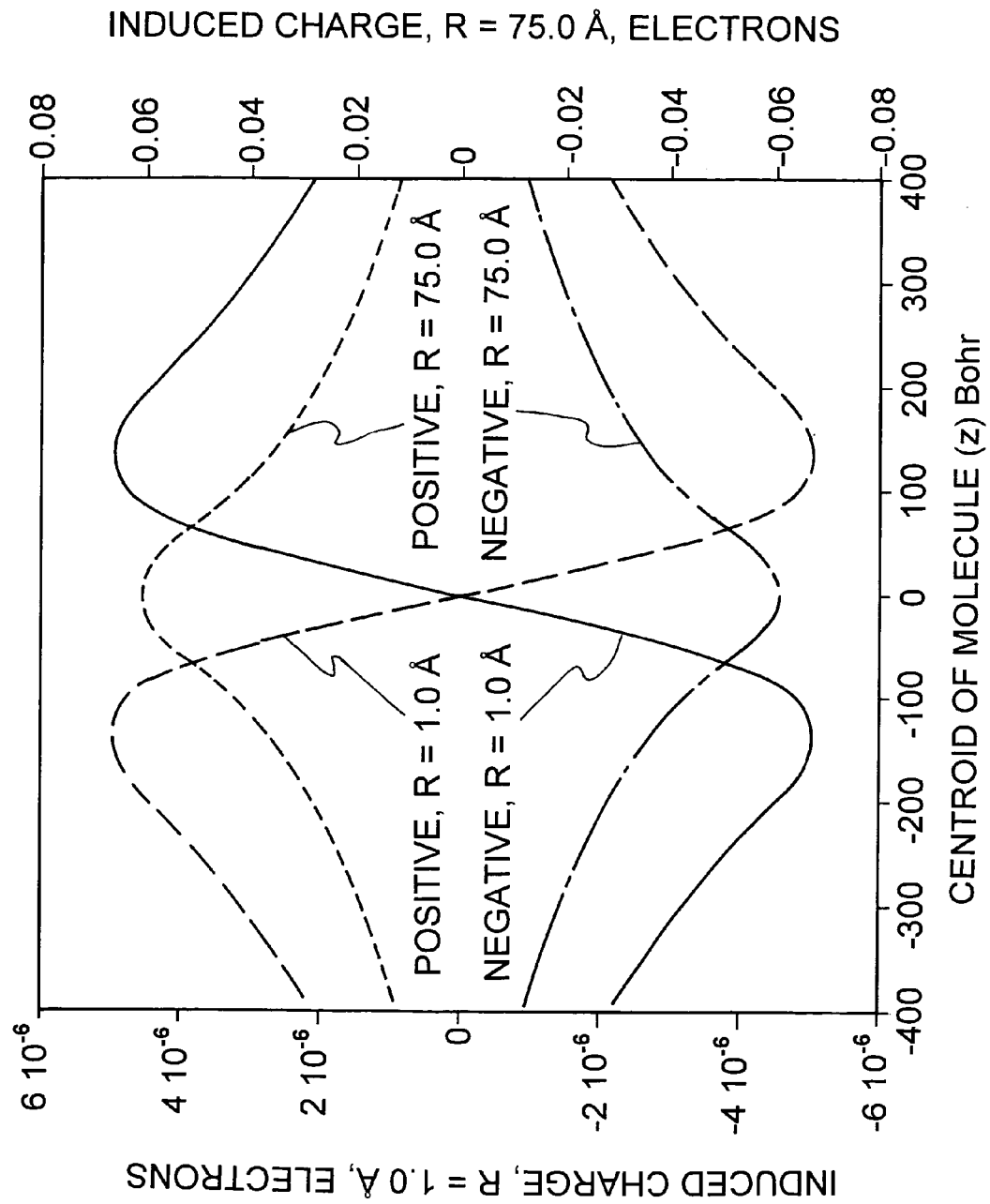
FIG. 9 is a plot showing the positive and negative surface polarization charges.

A better understanding of these effects involves the induced surface polarization charges (more precisely, the normal component of the electric field at molecular surface elements, see Equation 6.) In FIG. 9, a plot shows the positive and negative surface polarization charges on the elements of the 1 Å and 75 Å spheres as a function of the position of the centroid of each molecule. (These charges are obviously separated from each other.) For the 1 Å sphere, there is found two extrema each for the positive and negative charges, these extrema coinciding with the maxima in the magnitude of the electric field, zm, for the 1 Å sphere shown in FIG. 6. For the 75 Å sphere, the positive and negative induced charges have a markedly different character: a single extremum at the ring origin (z=0) is found for each.

Figure 10:
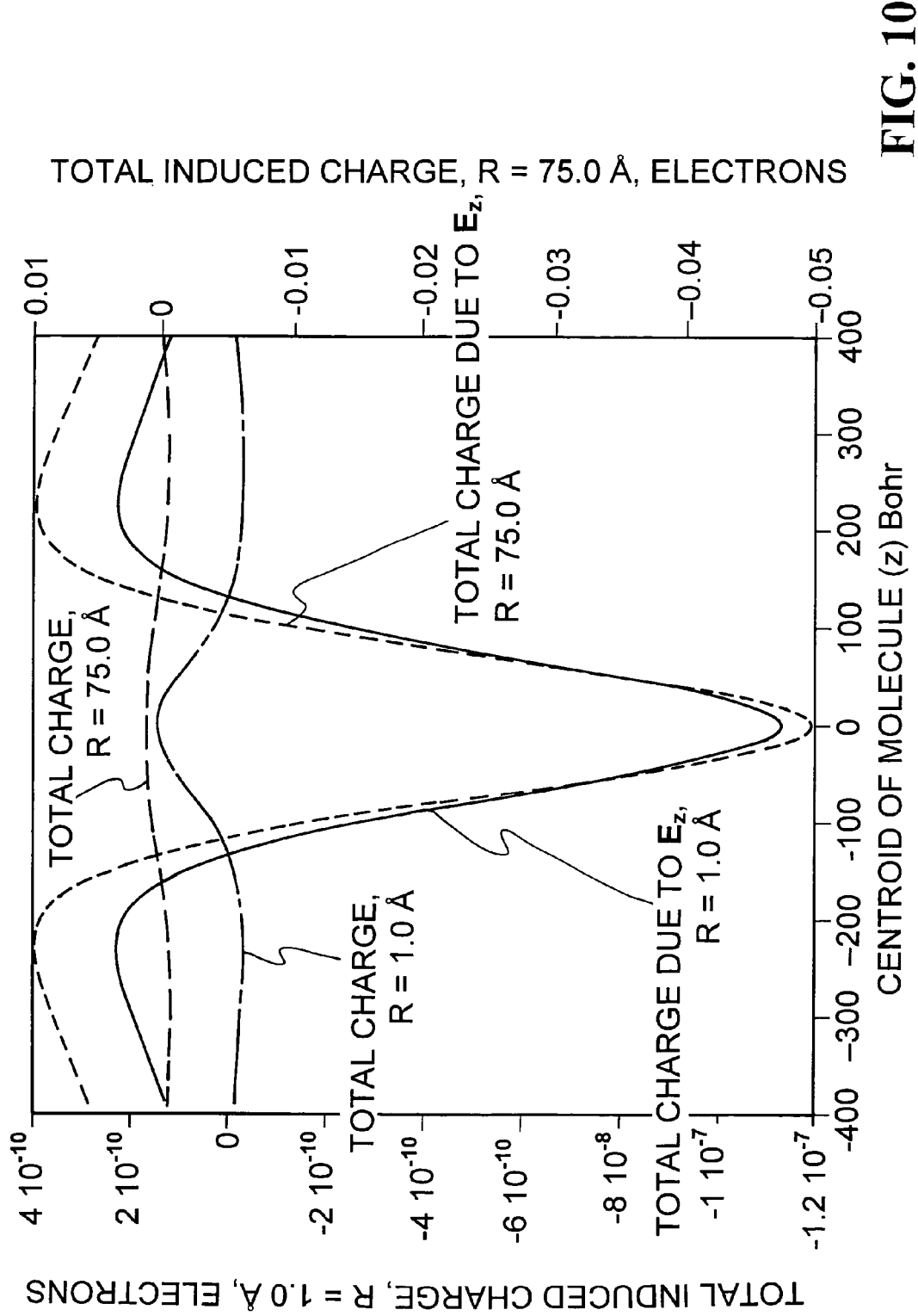
FIG. 10 is a plot showing a sum of the positive and negative charges.

In FIG. 10, there is a sum these positive and negative charges and plot the total induced charges on each of the two spheres as a function of the position of their centroids along the ring axis. For both spheres, there is found an increase in total induced positive charge near the origin (lines with open and closed circles) resulting from the x-component of the electric field (actually, from the large normal component, E·n, see Equation 6 and FIG. 6). As discussed above, for the small sphere, the negative charge induced on the leading edge of the molecule as it moves toward positive z values interacts with the large electric field at those leading elements resulting in a negative force. The excess positive charge induced by the x-component of the field on the small sphere multiplied by the z-component of the field at those elements is insufficient to overcome this negative force. On the other hand, in the case of the 75 Å sphere, there is a large increase in positive charge on elements of the sphere near the origin E·n again), and now this increase in positive charge, even though multiplied by a smaller field, is sufficient to overcome the larger field at the leading negative elements of the molecule. The character of the force changes from attractive to repulsive.

Additional understanding of this effect comes from performing similar calculations, determining the induced charges, in the absence of an x-component of the field. In FIG. 10, then, there is plotted the total induced charges for the 1 Å and 75 Å sphere when the field is (fictitiously) entirely along the z-axis (lines with open and closed squares). Here there is found an excess negative charge is induced for −zm<z<zm consistent with the larger field magnitude being near the origin, while for |z|>zm the induced polarization charge is positive, again consistent with the magnitude of the field at those furthermost elements from the origin. The magnitude of this effect is greater for the larger sphere; the point along z where the sign change occurs also differs somewhat because of the size, i.e., the location of the elements at which the charge is being induced. These calculations provide direct evidence of the influence of the x-component of the field on the induced charges and hence the character of the dielectrophoretic force.

Figure 11:
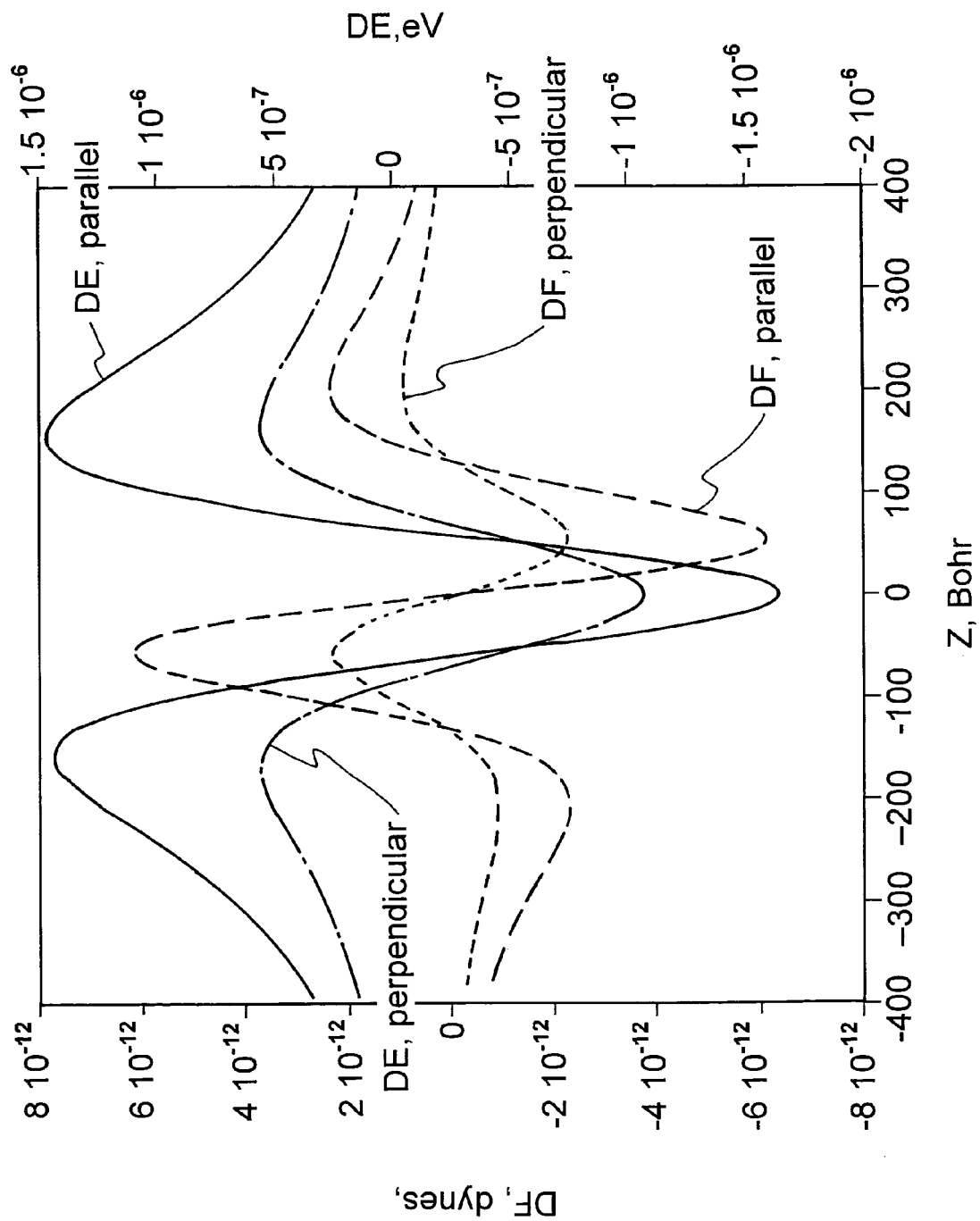
FIG. 11 shows results of the calculations.

The point-dipole approximation assumes the molecule to be spherical; the BEDF method presented here allows us to investigate shape effects. To this end, using the method described above, Applicants constructed a molecular surface surrounding a 10×10 atom planar molecule ("face-centered-cubic-like" geometry, radius of each atom, 1.2 Å) and then calculated the dielectrophoretic force on that planar molecule in the same ring environment as above. In FIG. 11, Applicants present the results of these calculations when the plane of the molecule is the same as the ring (labeled "parallel" in FIG. 11) and also when the molecule is rotated 90 degrees about the x-axis so its normal is perpendicular to the plane of the ring ("perpendicular" in FIG. 11). Both orientations give rise to attractions to the origin and repulsions at the maxima of the electric field (zm in FIG. 2), the force changing sign appropriately at these critical points. The parallel orientation results in forces which can be a factor of 2-3 greater than the parallel configuration. From FIG. 11, Applicants find the binding energy (difference in energy between the energy maxima and minima) for the parallel configuration is nearly twice the binding of the perpendicular geometry. These calculations indicate that shape effects must be considered when calculating dielectrophoretic forces on this scale.

As discussed above, nanotechnology has enabled interesting and technologically relevant geometrical configurations to be produced. Notable among these are multilayers or nanolaminates where atomic-scale layers of different materials can be produced adjacent to one another with single atom interfaces between them. Optimizing a nanoscale geometry is beyond the scope of this work; Applicants calculated the electric fields for a set of rings which is illustrative of the enabling power of the technology while providing further examples of the need to calculate dielectrophoretic forces using a molecular theory appropriate to these nanoscale configurations. When multiple rings are employed, the fields become more interesting. N rings of the same charge placed next to each other result in both an increase in the magnitude of the resulting field and a decrease in the position of the extrema relative to the plane of the end ring. An oppositely charged set of N rings could be configured along the same axis as the first at a distance chosen to optimize the magnitude of the field in-between the sets of rings.

Figure 12:
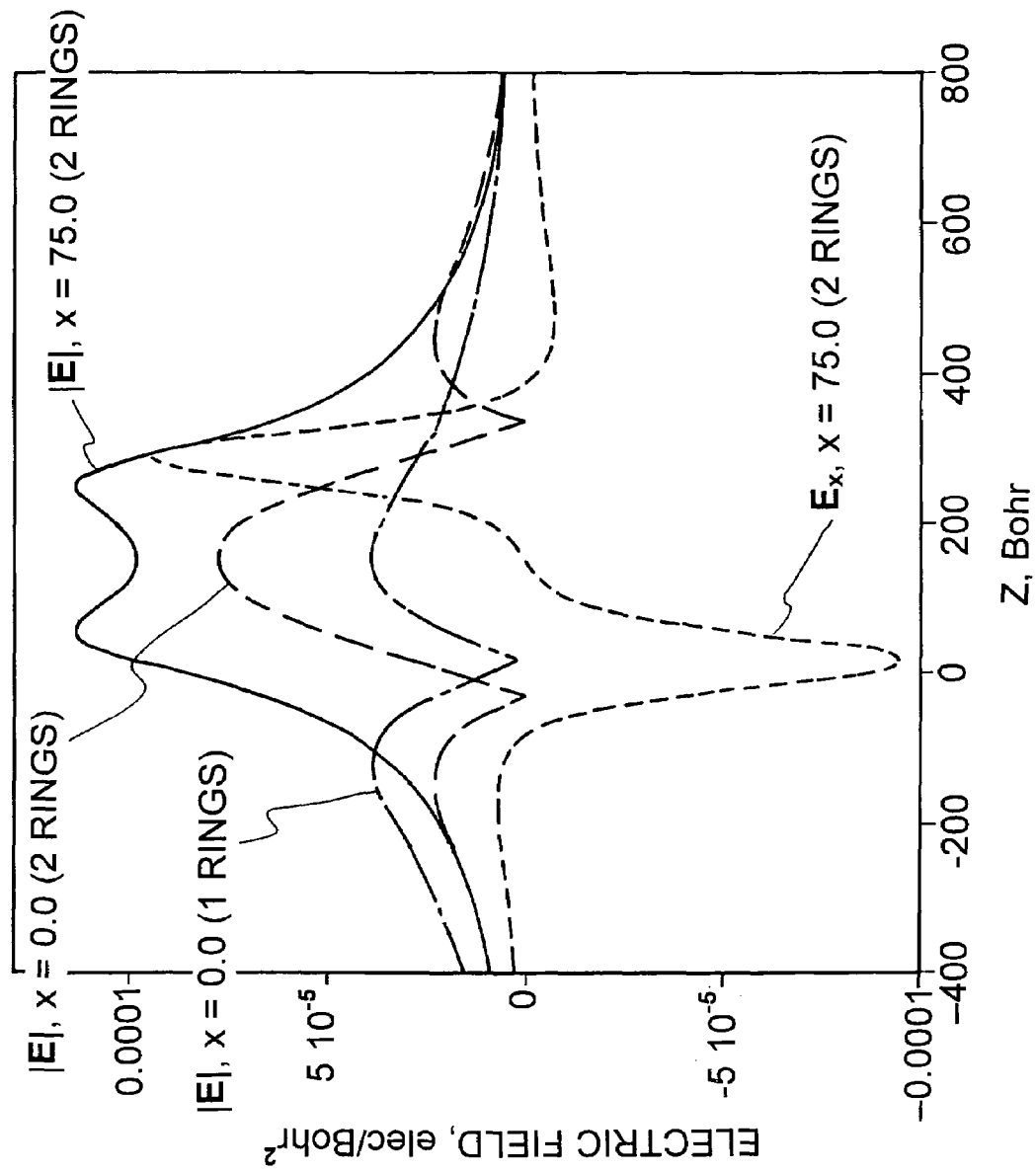
FIG. 12 shows an electric field profile.

A single set of 10 coaxial rings, axis along z, radius 100 Å, comprised of atoms each having a charge of +0.1 electrons as for the single ring above, placed next to each other in a row, will produce the electric field profile shown in FIG. 12. The set, or layer, has a charge density of ~3.4 $\mu C/cm^2$. The "leftmost" ring is placed (in the x-y plane) at z=0; the electric field is zero in the middle of the 10-ring configuration (at 19 Bohr=10.1 Å) and directed positively along the z-axis. A second 10-ring configuration, this time negatively charged, coaxial with the first (see FIG. 12) will also produce an electric field directed positively along the z-axis. By spacing the 10-ring sets so the extrema in the zcomponent of their electric fields coincide (separation=123.3 Å (233 Bohr)), Applicants optimize the field at 154 Bohr (81.5 Å), the midpoint between the rings (see FIG. 12). As can be seen in FIG. 7, this 2×10 ring configuration also gives rise to zeroes in the field at −15.3 Å (−29 Bohr) and 177.8 Å (336 Bohr) as well as secondary peaks at −73.6 Å (−139 Bohr) and 236.0 Å (446 Bohr).

The off-axis electric field for this 2×10 ring configuration is dramatically different from that along the axis. In FIG. 12, Applicants have also plotted the x-component and magnitude of the electric field for the 2×10 ring configuration along the z-axis at x=75 Å. The large xcomponent in the middle of the rings is responsible for the double-peaked character of the magnitude.

Figure 13:
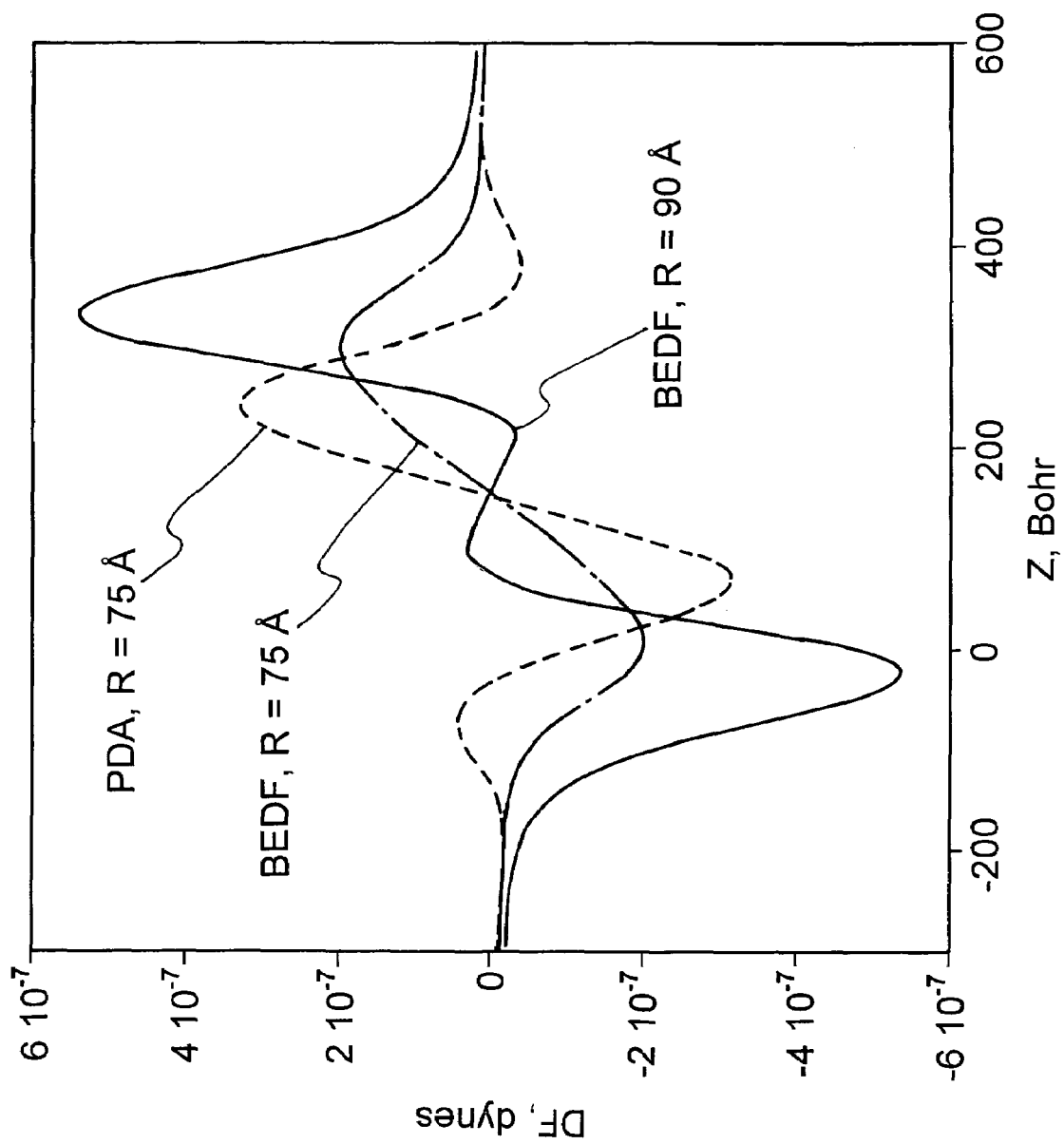
FIG. 13 shows results of dielectrophoretic force calculations.

In FIG. 13, Applicants show the results of Applicants dielectrophoretic force calculations for a 75 Å and 90 Å sphere in the 2×10 ring environment described above using the BEDF method and, for comparison, the PDA method for the 75 Å sphere. (The PDA method for the 90 Å sphere shows the same behavior as the 75 Å, with its magnitude adjusted for the radius.) The PDA predicts an attraction (negative slope of DF vs z as it goes through zero) where the electric field is zero (−29 Bohr and 336 Bohr) and a repulsion (positive slope of DF vs z as it goes through zero) where the secondary peaks in |E| occur (see FIG. 10). The BEDF method predicts no attractions or repulsions in these regions. Strikingly, at the maximum in the |E| field for the 2×10 ring, (see x=0.0 |E| field (z=154 Bohr) in FIG. 8), the BEDF and PDA methods applied to the 75 Å sphere agree as to the repulsive character of the force (positive slope of DF vs z as it goes through zero). However, the methods produce opposite characters for the force on a 90 Å sphere: The dielectrophoretic force on a 90 Å sphere in the field maximum is attractive according to the BEDF method. The PDA is probing the field and field gradient along the axis of the 2×10 ring configuration, while the molecular surface elements at which the charge is being induced are probing quite different regions because of the scale of the field variations (see FIG. 12).

The smart membrane of the present invention provides selective removal of aqueous species from electrolyte solutions. Such a technology could be widely used in the United States because many water supplies have been contaminated by small amounts of toxic substances, such as nitrate, arsenate, perchlorate and others. These substances must be removed before the water can be used for domestic use. The smart membrane of the present invention can be used to extract just those targeted species from the water.

In addition, the smart membrane of the present invention can be used to extract valuable substances from natural or industrial fluids that contain a mixture of species. For example, geothermal fluids contain potentially valuable amounts of lithium that could be marketed provided some technology were available to selectively extract the lithium.

The smart membrane of the present invention can have a dual purpose: removal of toxic species such as arsenic or selenium in order to produce potable water for drinking; and extraction of valuable species such as lithium or gold for marketing. Existing methods for selective removal include 'bulk' methods that remove all other salts in addition to the targeted species. These methods include reverse osmosis, electrodialysis, and the use of coagulants to remove the targeted species as a sorbant on the floc. The coagulant method is commonly used in water treatment plants. These methods are energy intensive because they remove many benign species as well as the target. The coagulant process is very labor intensive. Ion exchange is a selective method that uses ion exchange resins that absorb the targeted species. The ion exchange method is also very labor intensive and produces a secondary waste stream.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for treatment of water to remove nitrate from the water wherein the water includes nitrate ions and wherein the nitrate ions have a thickness and a charge, comprising:
  a water source containing nitrate ions
  a cathode,
  an anode,
  a voltage source connected to said cathode and to said anode, and
  a microengineered porous membrane stack, said microengineered porous membrane stack including an anion permeable membrane having a surface, wherein the water is directed along said surface, a series of nanopores extending through said anion permeable membrane from said surface, said nanopores having a pore size, wherein said pore size is smaller than double the thickness of the nitrate ions and wherein said pore size is such that when the water contacts said surface of said anion permeable membrane, said nanopores will be in a condition of double layer overlap and allow passage only of nitrate ions with a charge opposite to said electrical charge across said anion permeable membrane and wherein the nitrate ions are drawn toward said cathode for removal.

2. The apparatus for treatment of water of claim 1 wherein the nitrate ions comprise nonoparticles, including an electric field having electric field gradients produced by said cathode, said anode, and said voltage source connected to said cathode and to said anode, and wherein said nanopores have a pore size that is determined by using computer method of calculation of the dielectrophoretic force on said nanoparticles where variations in the electric field and electric field gradients are on the same nanoscale as said nanopartieles.

3. The apparatus for treatment of water of claim 1 wherein said voltage source connected to said cathode and to said anode produces a positive charge on said cathode and wherein said nitrate ions in the water are negative ions that pass through said anion permeable membrane.

4. The apparatus for treatment of water of claim 1 including a cation permeable membrane, wherein said voltage source connected to said cathode and to said anode produces a positive charge on said cathode and a negative charge on said anode and wherein the nitrate ions in the water are negative nitrate ions that pass through said anion permeable membrane.

5. An apparatus for treatment of water to remove arsenic from the water wherein the water includes arsenic ions and wherein the arsenic ions have a thickness and a charge, comprising:

a water source containing arsenic ions a cathode, an anode, a voltage source connected to said cathode and to said anode, and a microengineered porous membrane stack, said microengineered porous membrane stack including an anion permeable membrane having a surface, wherein the water is directed along said surface, a series of nanopores extending through said anion permeable membrane from said surface, said nanopores having a pore size, wherein said pore size is smaller than double the thickness of the arsenic ions and wherein said pore size is such that when the water contacts said surface of said anion permeable membrane, said nanopores will be in a condition of double layer overlap and allow passage only of arsenic ions with a charge opposite to said electrical charge across said anion permeable membrane and wherein the arsenic ions are drawn toward said cathode for removal.

6. The apparatus for treatment of water of claim 5 wherein said nanopores are drilled nanopores extending through said membrane.

7. The apparatus for treatment of water of claim 5 wherein said nanopores are etched nanopores extending through said membrane.

8. The apparatus for treatment of water of claim 5 wherein said nanopores are substantially 10 nanometers in diameter.

9. The apparatus for treatment of water of claim 5 wherein said nanopores comprise substantially 1 billion holes per square centimeter in said membrane.

10. An apparatus for treatment of water to remove nitrate from the water wherein the water includes nitrate ions wherein the nitrate ions have a thickness and a charge, comprising:

a water source containing nitrate ions a cathode, an anode, a voltage source connected to said cathode and to said anode, and a layered stack of microengineered membranes, said layered stack of microengineered membranes including cation permeable membranes and anion permeable membranes, a system for directing the fluid between said cation permeable membranes and said anion permeable membranes, and a series of nanopores extending through said cation permeable membranes and said anion permeable membranes, said nanopores having a pore size, wherein said pore size is smaller than double the thickness of the nitrate ions and wherein said pore size is such that when the water contacts said cation permeable membranes and said anion permeable membranes said nanopores will be in a condition of double layer overlap and allow passage only of nitrate ions with a charge opposite to said electrical charge across said cation permeable membranes and said anion permeable membranes and wherein the nitrate ions are drawn toward said cathode for removal.

11. The apparatus for treatment of water of claim 10 wherein the nitrate ions comprise nonoparticles, wherein said voltage source that produces an electrical charge across said cation permeable membranes and said anion permeable membranes utilizes an electric field having electric field gradients, and wherein said nanopores have a pore size that is determined by using computer method of calculation of the dielectrophoretic force on said nanoparticles where variations in the electric field and electric field gradients are on the same nanoscale as said nanoparticles.

12. The apparatus for treatment of water of claim 10 wherein said voltage source that produces an electrical charge across said cation permeable membranes produces a positive charge and wherein said anion permeable membranes comprises an anion permeable membrane wherein the nitrate ions in the fluid water are negative ions that pass through said anion permeable membranes.

13. The apparatus for treatment of water of claim 10 wherein said cathode, said anode, and said voltage source connected to said cathode and to said anode produces an electrical charge across said cation permeable membranes produces a positive charge on said cathode and wherein the nitrate ions in the water are negative nitrate ions that pass through said anion permeable membranes.

14. An apparatus for treatment of water to remove arsenic from the water wherein the water includes arsenic ions wherein the arsenic ions have a thickness and a charge, comprising:

a water source containing arsenic ions a cathode, an anode, a voltage source connected to said cathode and to said anode, and a layered stack of microengineered membranes, said layered stack of microengineered membranes including
cation permeable membranes and
anion permeable membranes,
a system for directing the fluid between said cation permeable membranes and said anion permeable membranes, and
a series of nanopores extending through said cation permeable membranes and said anion permeable membranes, said nanopores having a pore size, wherein said pore size is smaller than double the thickness of the arsenic ions and wherein said pore size is such that when the water contacts said cation permeable membranes and said anion permeable membranes said nanopores will be in a condition of double layer overlap and allow passage only of arsenic ions with a charge opposite to said electrical charge across said said cation permeable membranes and said anion permeable membranes and wherein the arsenic ions are drawn toward said cathode for removal.

15. The apparatus for treatment of water of claim 14 wherein said nanopores comprises a series of drilled nanopores extending through said cation permeable membranes and said anion permeable membranes.

16. The apparatus for treatment of water of claim 14 wherein said cation permeable membranes and said anion permeable membranes comprises a series of etched nanopores extending through said cation permeable membranes and said anion permeable membranes.

17. The apparatus for treatment of water of claim 14 wherein said nanopore comprises a series of nanopore of substantially 10 nanometers in diameter.

18. The apparatus for treatment of water of claim 14 wherein said nanopore comprises substantially 1 billion holes per square centimeter in said membrane.

* * * * *